Figure 15:
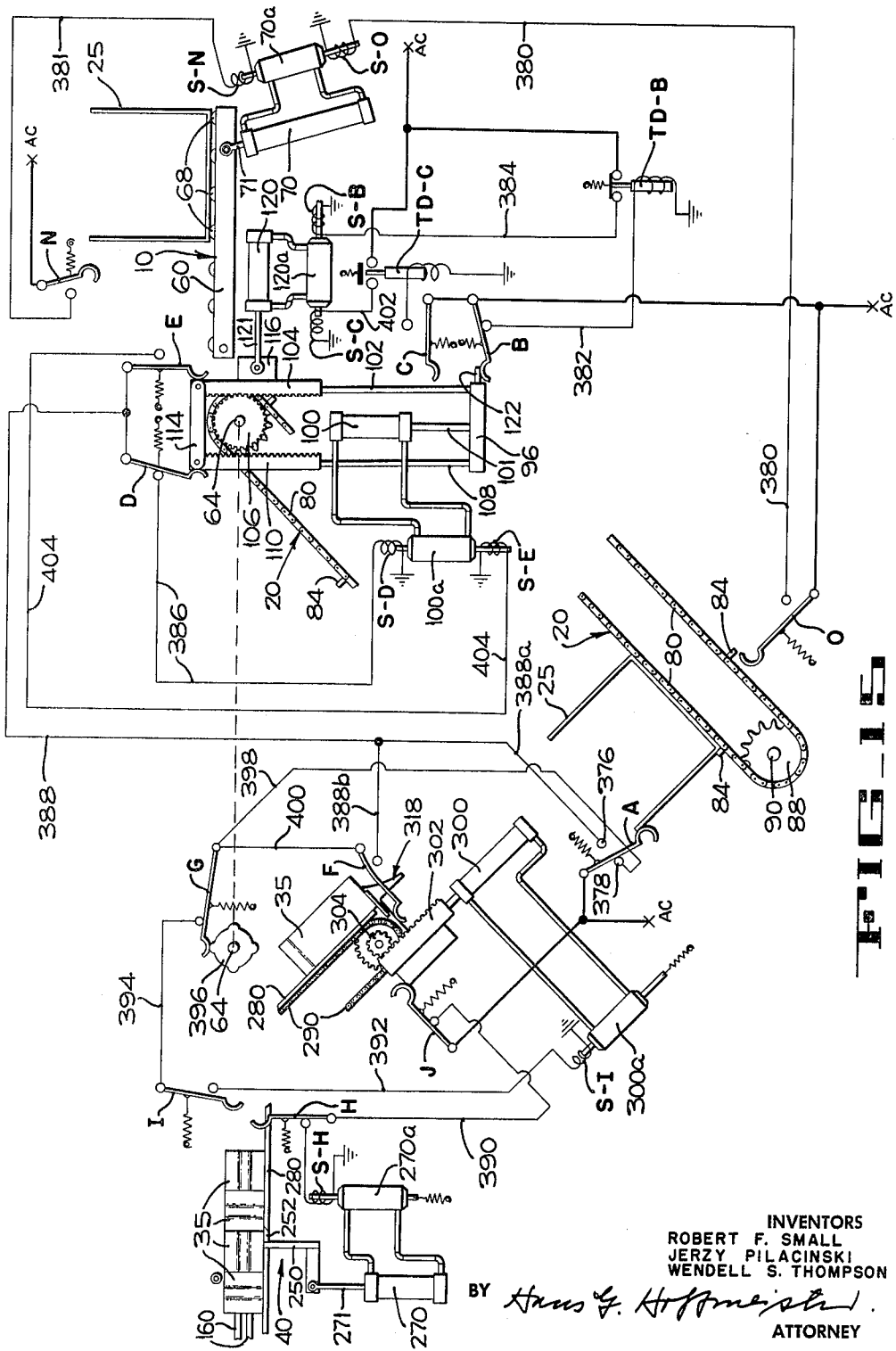

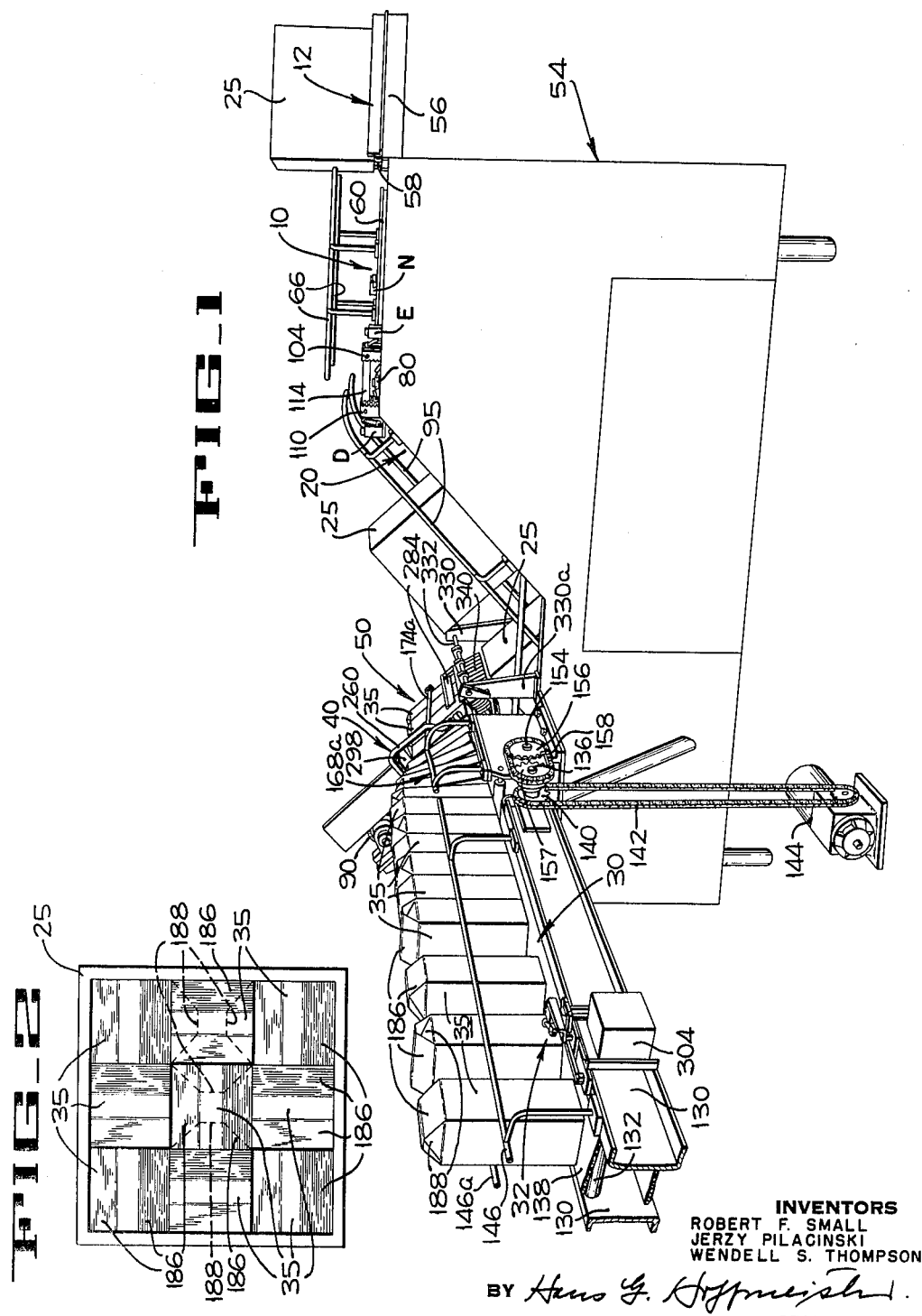

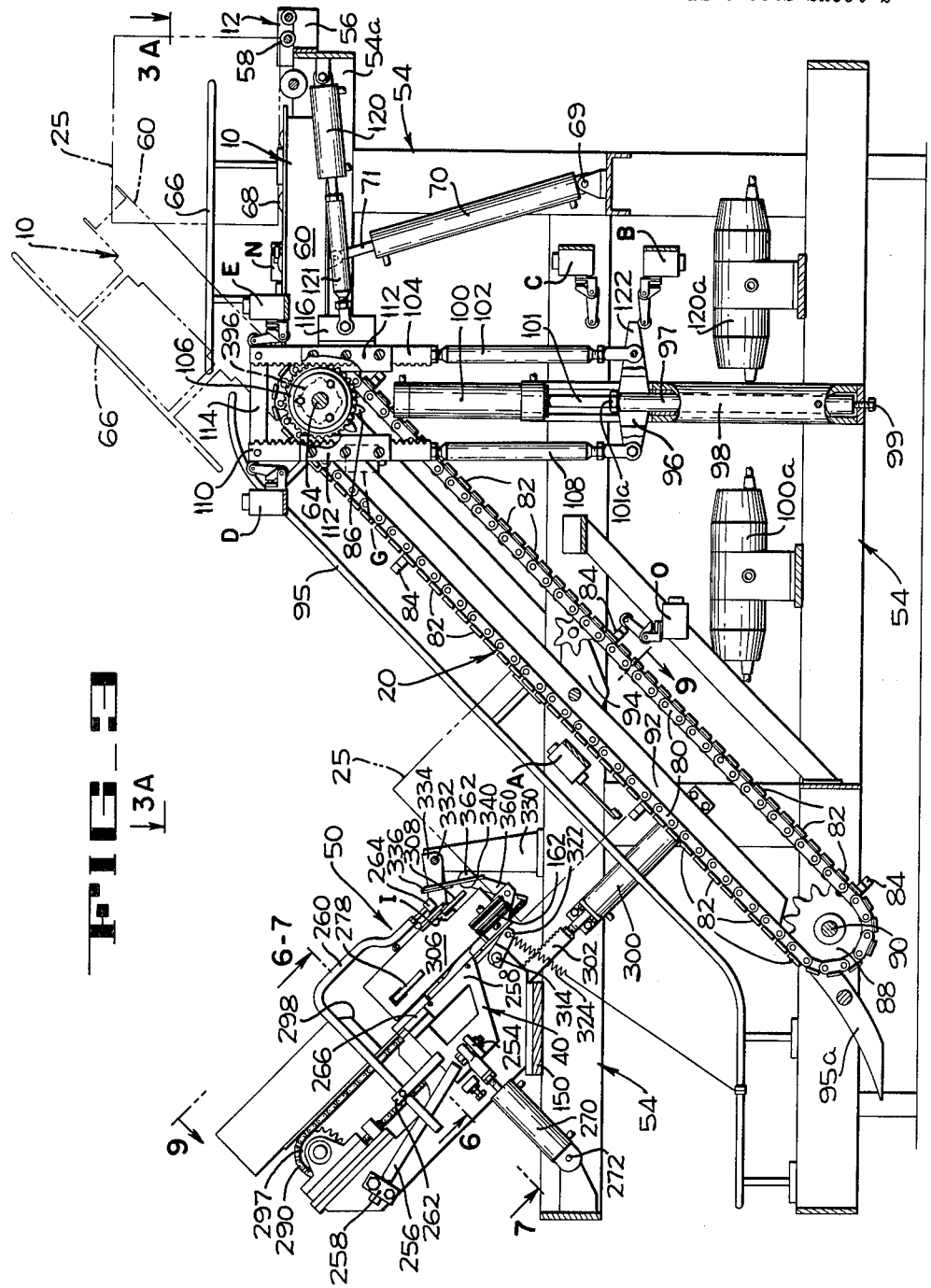

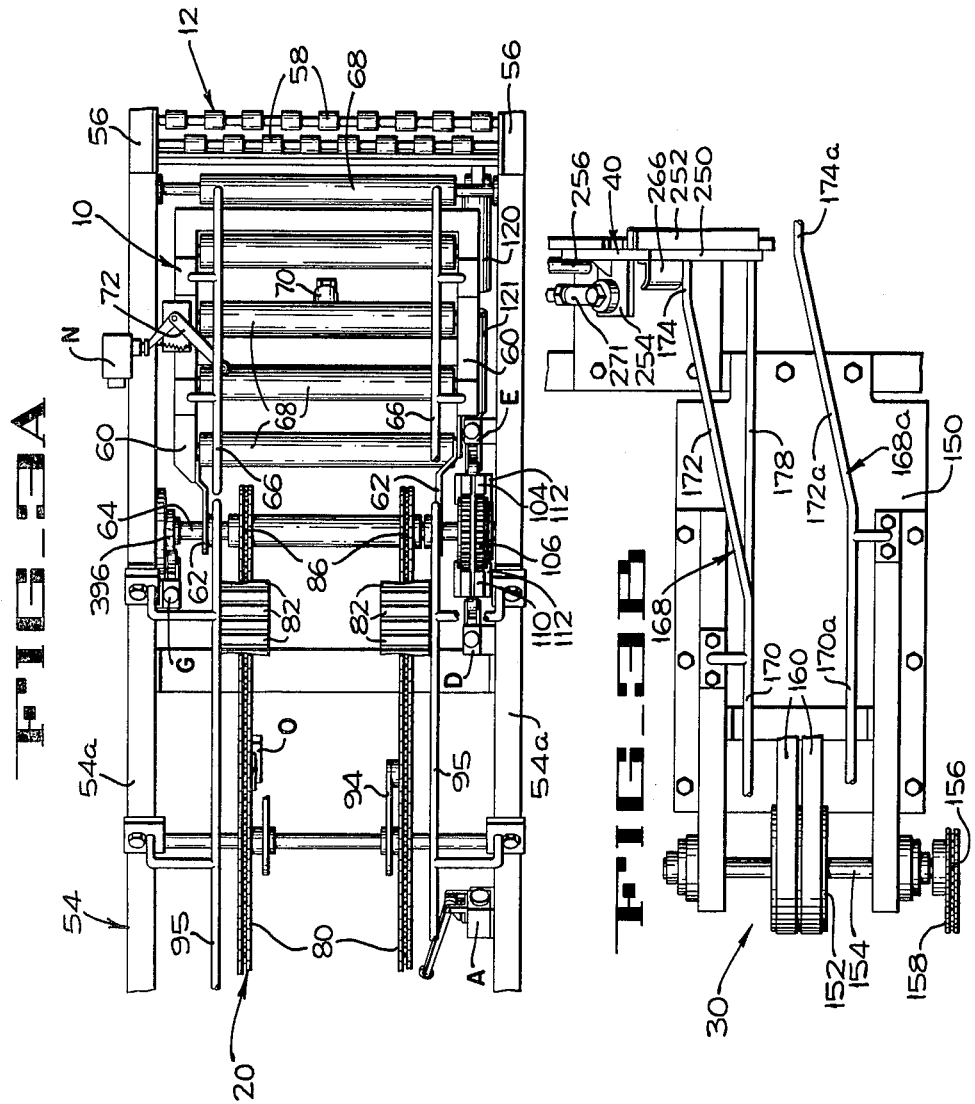

May 24, 1966 R. F. SMALL ETAL 3,252,265
APPARATUS FOR CASING ARTICLES
Filed Aug. 8, 1962 11 Sheets-Sheet 4
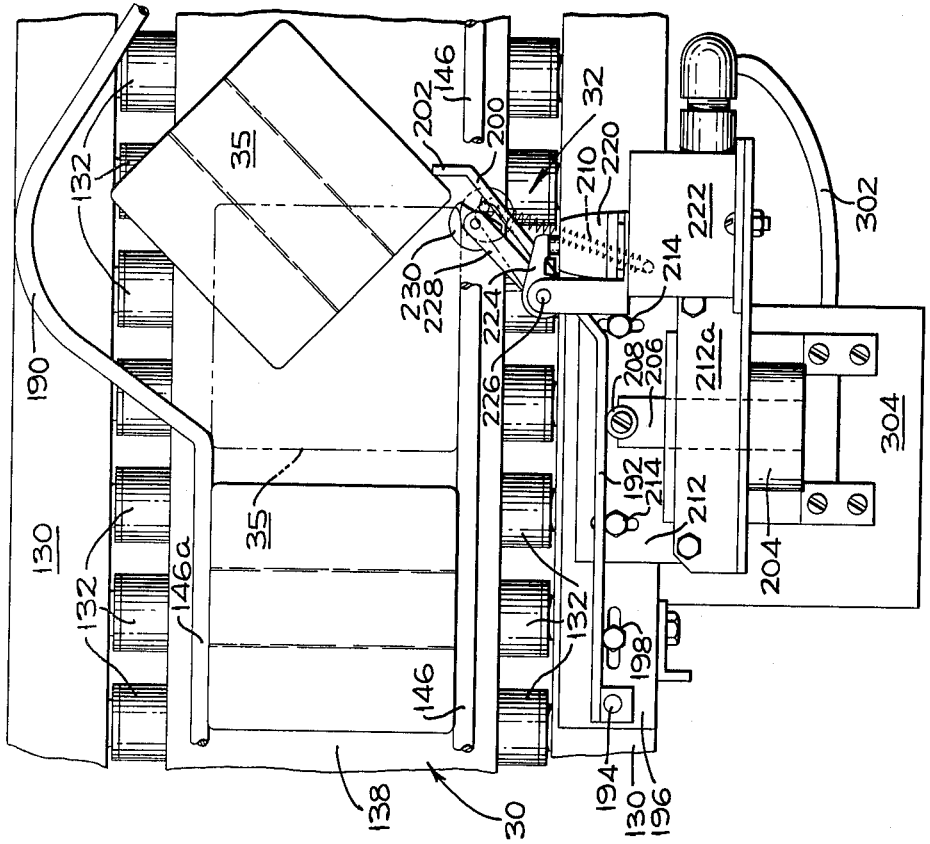
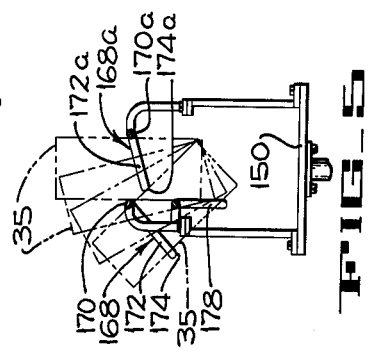
INVENTORS
ROBERT F. SMALL
JERZY PILACINSKI
WENDELL S. THOMPSON
BY Hans G. Hoffmeister
ATTORNEY May 24, 1966 R. F. SMALL ETAL 3,252,265
APPARATUS FOR CASING ARTICLES
Filed Aug. 8, 1962 11 Sheets-Sheet 5
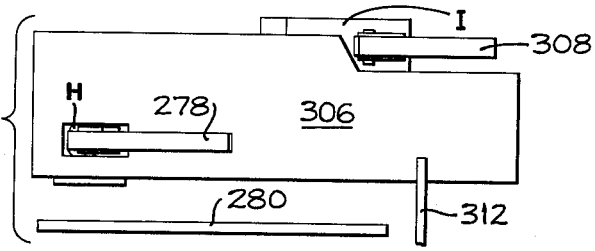
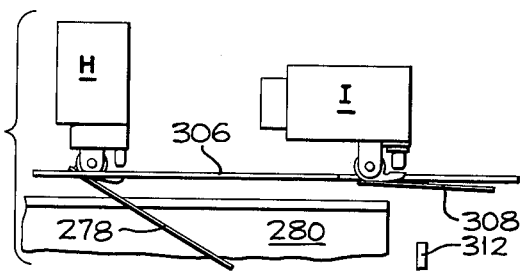
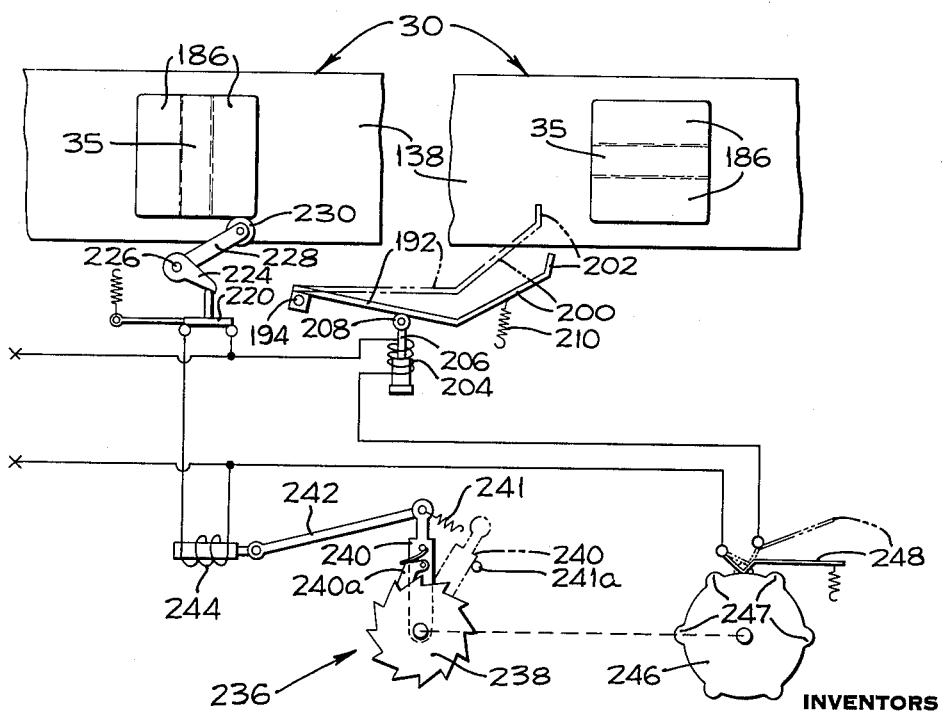
INVENTORS
ROBERT F. SMALL
JERZY PILACINSKI
WENDELL S. THOMPSON
BY *Hans G. Hoffmeister*
ATTORNEY

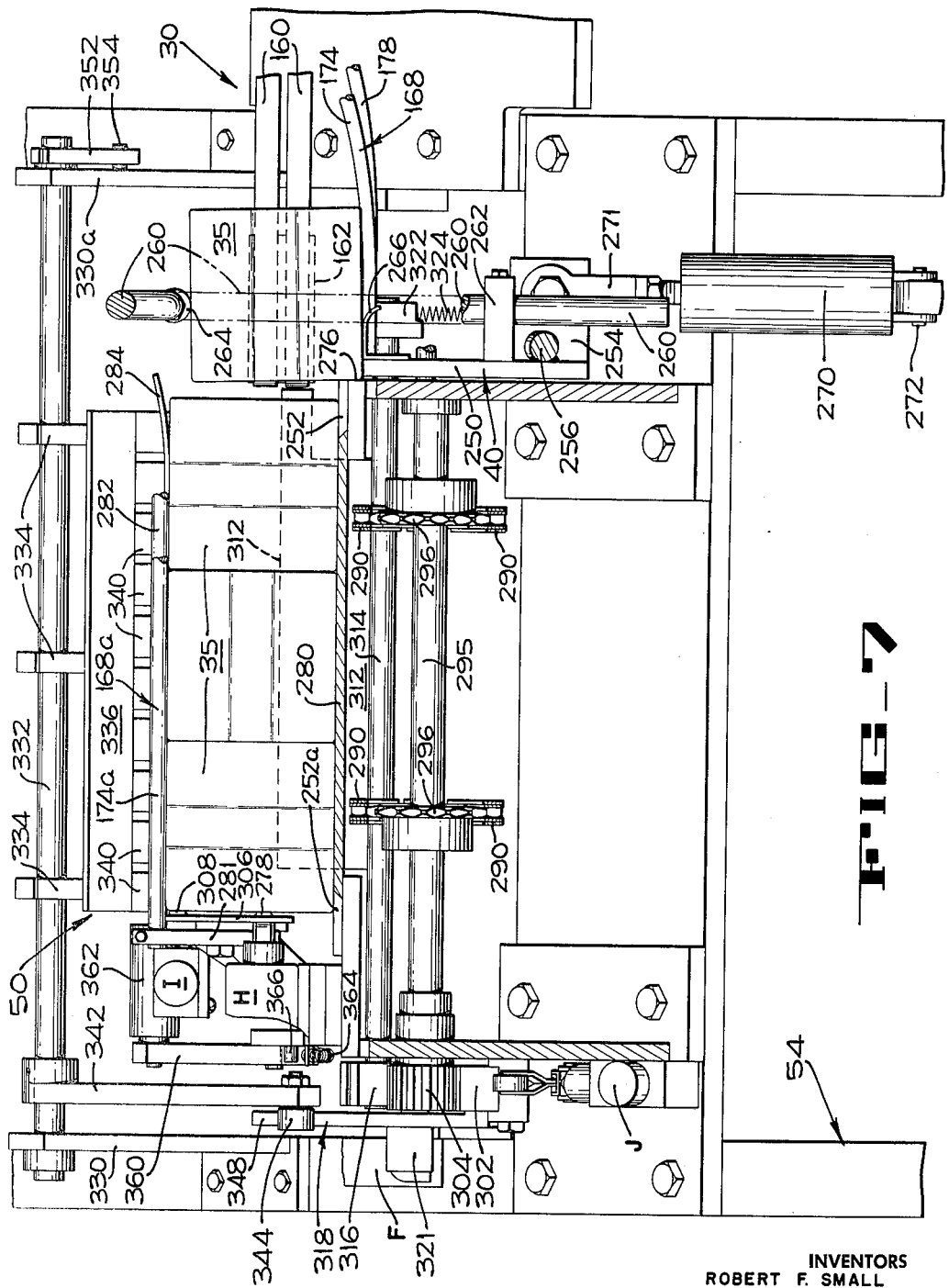

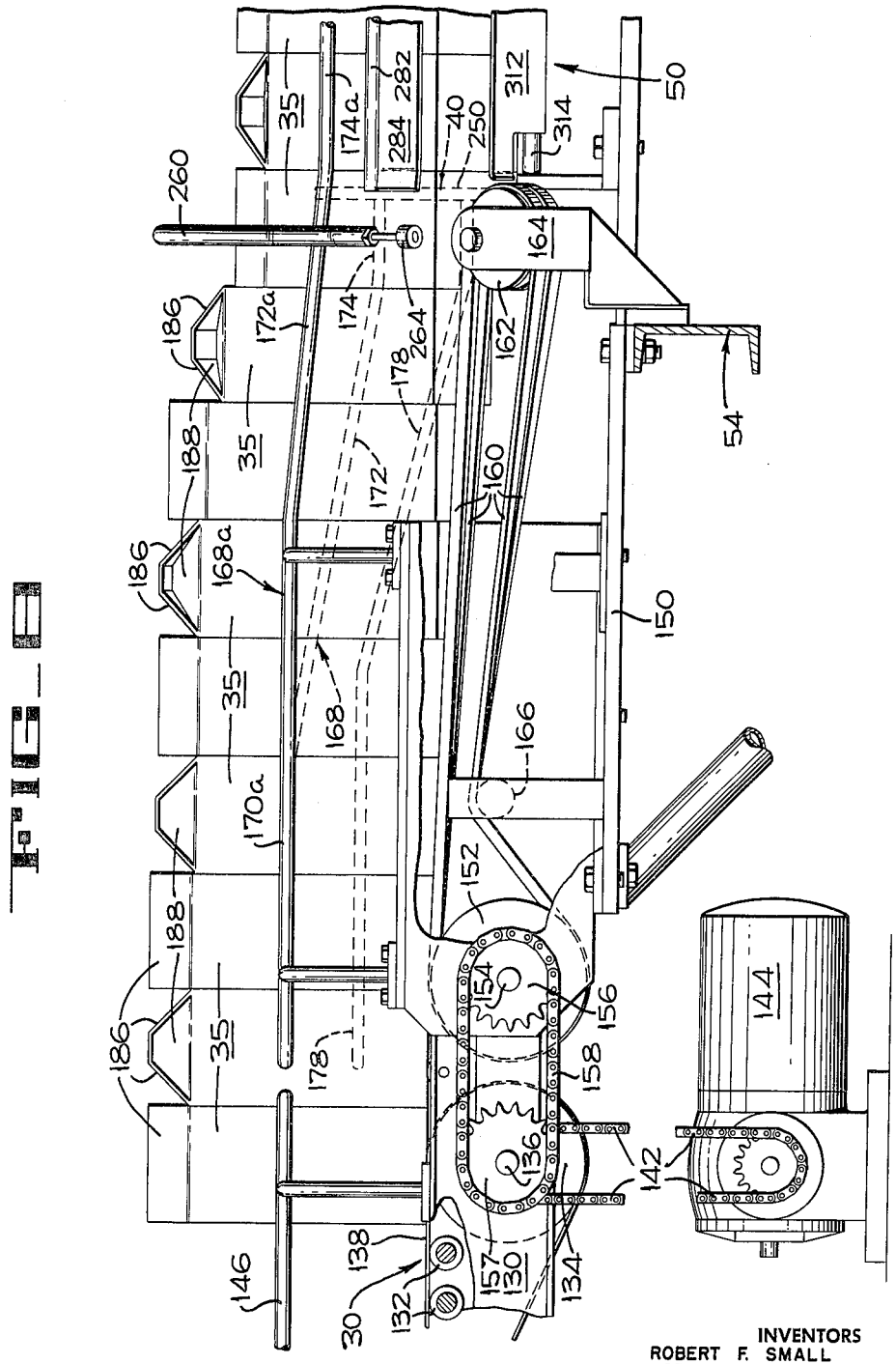

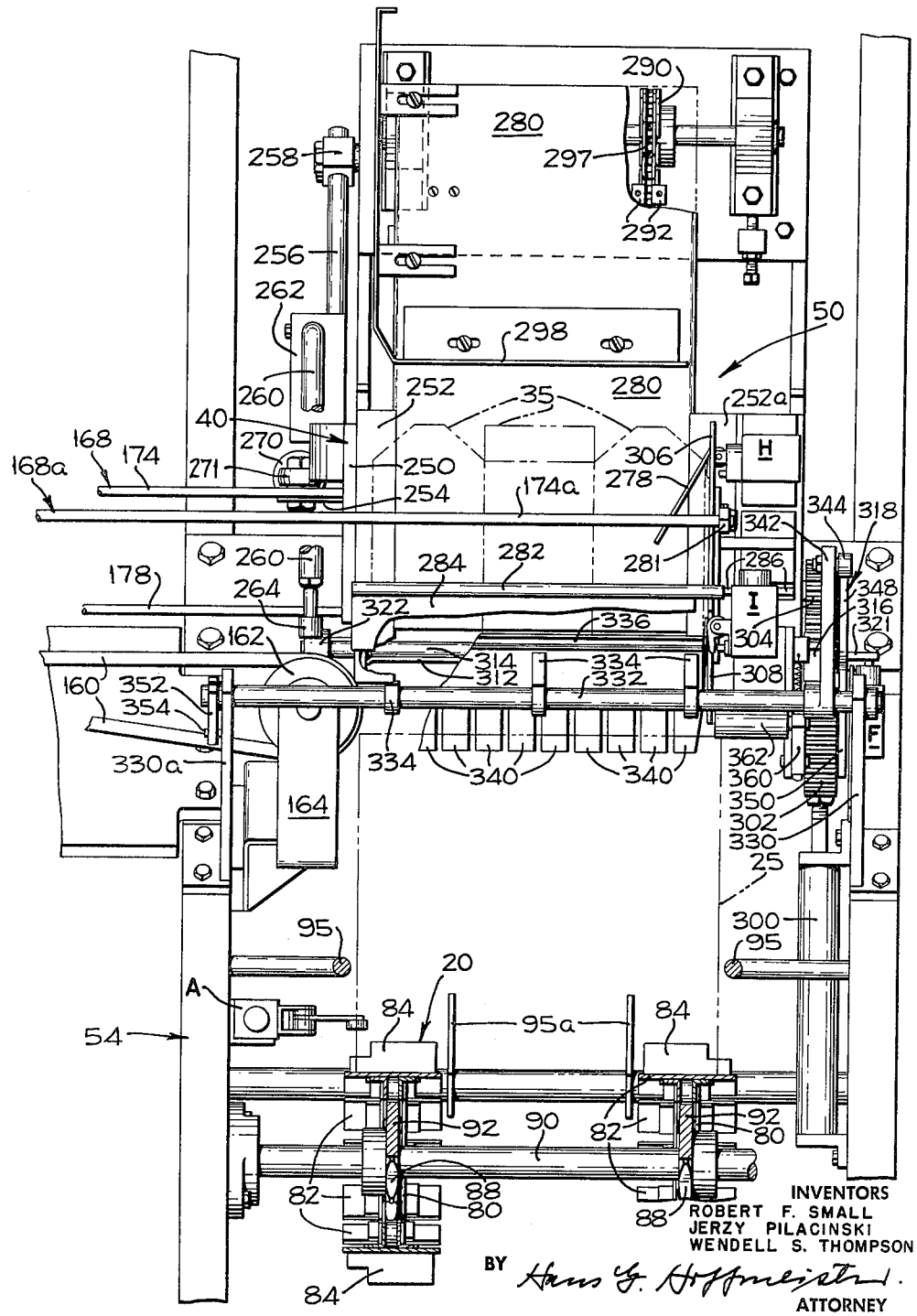

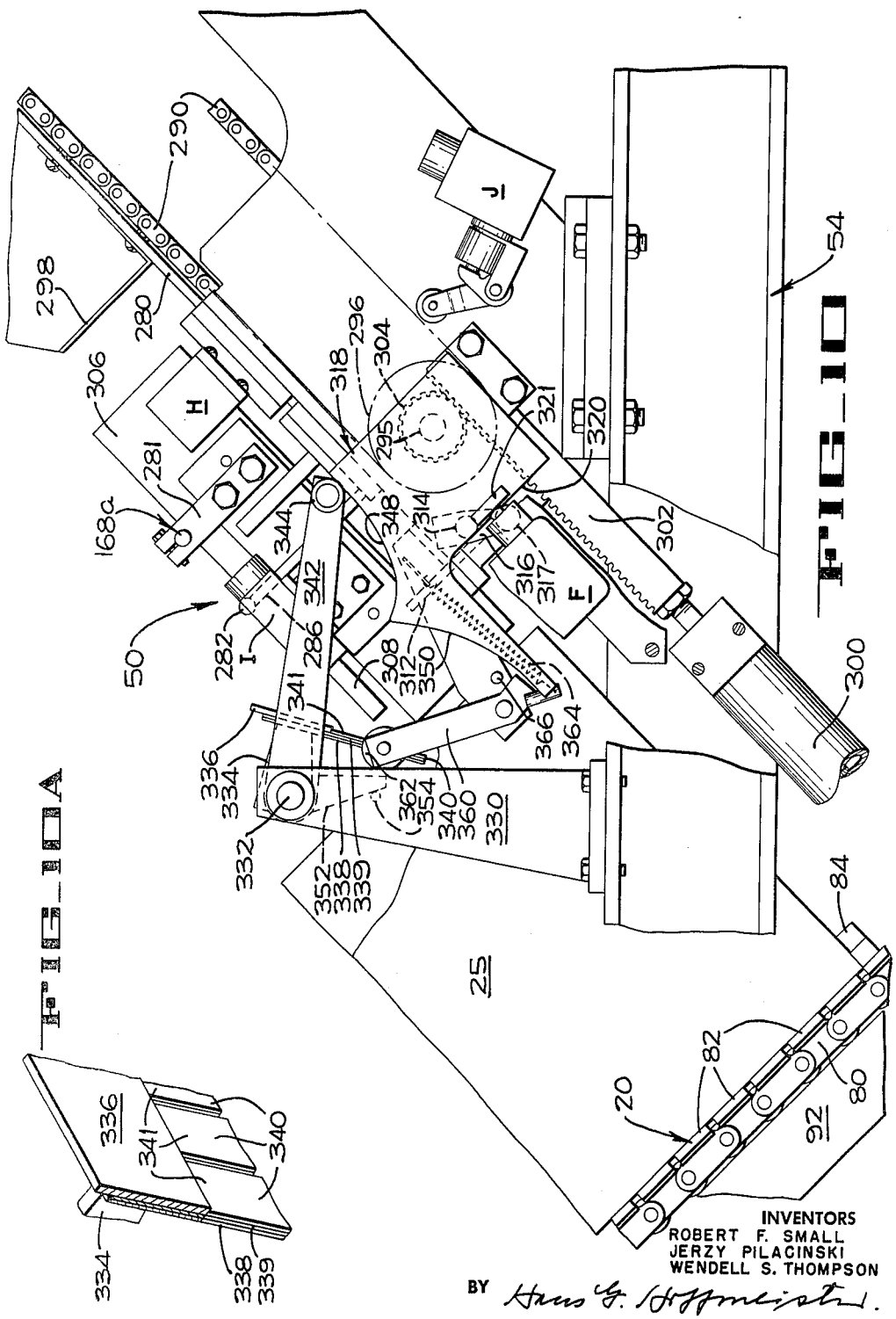

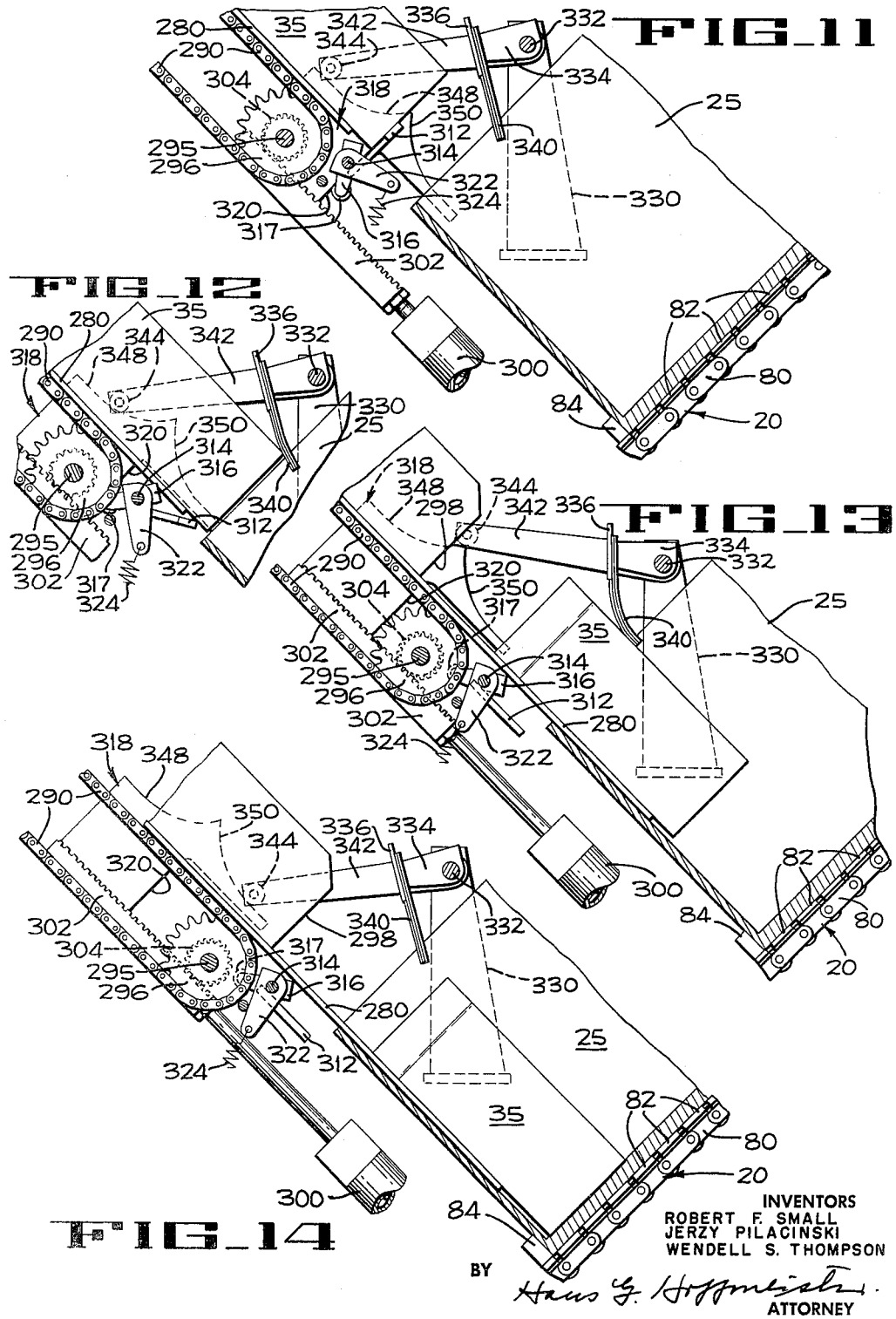

INVENTORS
ROBERT F. SMALL
JERZY PILACINSKI
WENDELL S. THOMPSON
ATTORNEY

United States Patent Office 3,252,265
Patented May 24, 1966

3,252,265
APPARATUS FOR CASING ARTICLES
Robert F. Small, San Jose, and Jerzy Pilacinski and Wendell S. Thompson, Los Gatos, Calif., assignors to FMC Corporation, San Jose, Calif., a corporation of Delaware
Filed Aug. 8, 1962, Ser. No. 215,592
14 Claims. (Cl. 53—55)

This invention relates to the filling of cases with a number of articles of uniform size. The embodiment of the invention to be described in detail fills wire cases or baskets with cardboard cartons of milk or the like, and is automatic in its operation. The apparatus to be described involves three major components namely a case conveyor, a carton conveyor and a loader head. The carton conveyor advances the cartons single file to the casing apparatus. The cartons are supplied in rows of three to the loading head. The empty cases are advanced by the casing conveyor beneath the loading head, and the loading head descends and inserts the cartons into the cases without damaging the cartons. The casing conveyor is stepped or indexed by feed increments so as to make possible loading the cases in successive rows, and the case conveyor is also automatically stepped by increments sufficient to bring the next empty case into the first row loading position.

It is an object of the present invention to load relatively fragile articles such as cardboard milk cartons into cases without bending or damaging the cartons. A further object is to load articles that have fragile or irregularly shaped tops into cases without requiring any gripping action on the tops during loading.

Another object is to provide means for operating the loading device on a demand basis in accordance with the condition of cartons supplied at random to the loading head by the carton conveyor.

Still another object of the invention is to automatically advance or step the casing conveyor in accordance with loading requirements.

Another object is to cause the oncoming file of cartons to effect the loading of a row or file of cartons on the loading head, without unduly pressing against a row of cartons deposited on the loading head during the loading operation.

Another object is to provide the above mode of operation without requiring precise or exact timing of the loading mechanism and its controls.

Another object is to provide a precise drive or stepping mechanism for the case conveyor that operates with a suitable precision and without accumulated error, regardless of minor variation in the stroke of a rack and pinion mechanism that effects the drive.

Another object is to provide a case conveyor drive that cannot coast when not being driven.

Still another object is to facilitate removal of rectangular cardboard cartons having finger recesses in the upper ends thereof. This is accomplished by a carton turning mechanism which turns cartons in accordance with a preselected pattern, while the cartons are on the carton delivery conveyor, and before they are supplied to the loading head.

Another object is to provide for a controlled braking operation of the cartons as they are loaded into the case, to prevent slamming of the cartons against the bottom of the case at the end of the loading operation for each row of cartons.

The manner in which these and other objects may be accomplished will be apparent from the following detailed description of a preferred embodiment of the invention taken in conjunction with the accompanying drawings.

Another object is to provide rapid, reliable operation without damage to the articles being loaded into the cases.

In the drawings:
FIGURE 1 is a perspective of the apparatus including the case and carton conveyors.
FIGURE 2 is a plan of a case loaded with milk cartons of the type which the embodiment of the invention described in detail below is designed to handle.
FIGURE 3 is a vertical section of the machine as viewed in FIGURE 1, with the near side cover plate and portions of the frame removed.
FIGURE 3A is a plan of the case conveyor taken on lines 3A—3A of FIGURE 3.
FIGURE 3B is a plan of the transfer section of the carton conveyor.
FIGURE 4 is a plan of the carton turning mechanism, indicating its mode of operation.
FIGURE 4A shows the circuit of the carton turning mechanism.
FIGURE 4B is an elevation of the gate and loader control switches.
FIGURE 4C is a plan of the same.
FIGURE 5 is a diagram of the carton lay-over action that occurs during transfer from the carton conveyor to the loading head.
FIGURE 6 is a fragmentary section taken on lines 6—6 of FIGURE 3, with the gate raised.
FIGURE 7 is a section taken on lines 7—7 of FIGURE 3, with the gate lowered.
FIGURE 8 is a fragmentary side elevation of the carton conveyor drive mechanism.
FIGURE 9 is a section taken on lines 9—9 of FIGURE 3, showing the loading head.
FIGURE 10 is an enlarged side elevation of the loading head brake mechanism.
FIGURE 10A is an enlarged fragmentary perspective of the brake shoe.
FIGURES 11 to 14 are operational diagrams of a loading cycle.
FIGURE 15 is a schematic diagram of the electrical circuit and switches that automatically control the apparatus.

GENERAL DESCRIPTION OF THE APPARATUS AND ITS OPERATION

Referring to FIGURE 1, the main elements of the apparatus include a case lifter 10 which is normally in its raised position but which is shown in its lowered horizontal position in the figure, ready to receive a case 25. The cases that are illustrated are actually wire baskets employed in the dairy industry. For convenience the cases 25 are not illustrated as wire baskets, but rather are drawn in line outline. As seen in FIGURE 2, the cases receive nine cardboard cartons 35, containing liquids such as milk.

Returning to FIGURE 1, a case 25 is shown disposed on an input conveyor 12 ready to enter the case lifter 10. Empty cases may also be supplied manually to the case lifter. Extending downwardly at an angle of 45° is a case conveyor 20, (hidden behind a cover plate in FIG. 1) which is indexed step by step during operation of the apparatus. Feeding in at right angles to the path of the case conveyor is a carton conveyor 30, which brings cartons in spaced relation to a carton turner 32. The carton turner turns every other carton to form the pattern illustrated in FIG. 2, when the cases are completely loaded. This pattern provides ready access to the finger recesses provided in cartons of the type illustrated in the drawings.

After the cartons are turned, they pass over a gate 40 and are transferred to a loading head 50 at right angles to the case conveyor. The carton conveyor gradually lays the cartons over to match the 45° angle of the loading head 50, and the gate 40 prevents more than three cartons from entering the loading head. When the first row of three cartons is completely transferred to the loading head 50, and if a case is properly positioned to receive the first row of cartons by the case conveyor 20, the loading head descends and deposits the first row of cartons into the case on the case conveyor. The loading head is then retracted or lifted to its upper or loading position, to receive a new row of three cartons. During this time the case conveyor is indexed by one carton width, to position the partially loaded case to receive the second row of cartons. This action continues until the case is filled, whereupon the case conveyor automatically indexes the number of carton widths required to bring the next case under the loader head for receiving its first row of cartons. During this period of automatic case conveyor advance, the loading head is locked out of operation. Interlocks are also provided so that the loading head cannot descend until it is filled with the selected number of cartons, (three in this case) nor will the loading head descend until a case is positioned so as to receive the row of cartons on the loading head in the proper zone of the case.

A more detailed description of the apparatus and its operation will now be given.

INPUT CONVEYOR AND CASE LIFTER

Referring principally to FIGS. 3 and 3A, the frame of the machine is indicated generally at 54 and includes spaced horizontal members 54a which mount the case lifter 10, and to which are connected frame members 56 of the input conveyor 12. The construction of the input conveyor is not important to the invention. As shown it includes free rollers 58 mounted in frame members 56.

As is best seen in FIG. 3 the case lifter 10 has a frame 60 having projecting pivot arms 62. Arms 62 are pivoted on a combined case conveyor drive and pivot shaft 64, mounted in the main frame of the apparatus. Guide rails 66 project upwardly from the case lifter frame, and the frame is also provided with free rollers 68 for supporting the cases. Means are provided to lower the case lifter 10 for receiving a case from the input conveyor, and then raise it to feed the case to the case conveyor 20. Pivotally mounted on the frame of the apparatus at 69 is a case lifting cylinder 70 which has a piston rod 71 pivotally connected to the case lifter frame 60. The case lifter cylinder 70 is controlled by a four-way "momentary" case lifter cylinder valve 70a (see FIG. 15). This valve (as are the other valves to be referred to as four-way momentary valves throughout the specification), is of the type which is shifted in one direction by one solenoid and in the opposite direction by another solenoid, with the valve remaining in its shifted position after the solenoid that was last energized is de-energized. The valve 70a is shifted to raise the case lifter by a normally open switch N (FIGS. 3 and 3A) that is closed by a case on the case conveyor, as will be seen in the detailed description of operation that follows. The case conveyor is lowered by the momentary closing of a switch O, FIGS. 3 and 15, operated by a lug on the case conveyor chains, as will also be described in detail presently.

As seen in FIG. 3A, the switch N is operated by a pivoted arm 72 which normally projects in the path of the case on the case conveyor. As mentioned, the case lifter is normally in its raised position as illustrated in phantom FIG. 3. The case lifter has been lowered to its horizontal position as illustrated in solid lines in FIG. 3, in order to receive a case. This can only occur when the case conveyor 20 is properly positioned for transfer of the case from the case lifter to the case conveyor.

CASE CONVEYOR

Referring principally to FIGS. 3 and 3A, the case conveyor includes a pair of spaced conveyor chains 80 having short shoes 82 connected to the chain links. In order to support and position cases in selected relative position on the case conveyor, sets of lugs 84 project from the conveyor chains. Lugs 84 are spaced apart by a distance that is a multiple of the width of a single carton. For example, with a three row case and with cardboard milk cartons having a width of 3¾ inches, the lugs 84 will be spaced at least four carton width units or 15 inches apart. Actually, in order to make possible the handling of four row cases as well as the three row cases illustrated in the drawings, the lugs 84 are spaced six units or 22½ inches apart, and this is the spacing illustrated in the drawings.

Returning to the case conveyor chain assembly, the chains are trained over upper sprockets 86 on the combined pivot and drive shaft 64 that also supports the case lifter frame 60, as previously described. Lower spraekets 88 serve as idlers and are mounted on a shaft 90 pivoted in the base portion of the machine frame. Each chain 80 is supported by an elongated chain guide 92, and slack in each chain is taken up by a chain tightener 94, the details of which do not form part of the invention. The cases are guided along the case conveyor by guide rails 95, and full cases are delivered to a platform or take-away conveyor (not shown) by runners 95a at the delivery end of the case conveyor.

The case conveyor is driven or indexed by a reciprocating rack and pinion unit, which converts reciprocating motion into intermittent unidirectional rotation, and which insures a precise stepping action of the cases through the apparatus. Referring to FIG. 3, a crosshead 96 is integral with the upper end of a guide rod 97 which rod slides in a vertical sleeve 98 fixed to the frame of the apparatus. The lowermost position of the guide rod 97 is, determined by an adjustable stop screw 99 locked in a crosspiece forming part of the frame of the apparatus. Driving power is supplied by a casing conveyor drive cylinder 100 having a piston rod 101 which is threaded into the guide rod 97 the connection being locked by a jam nut 101a. Jam nut 101a serves as a stop, to limit the upper motion of the driving mechanism as the nut strikes the end of the cylinder 100. The drive cylinder 100 is controlled by another four-way momentary solenoid operated valve 100a. The direction of reciprocation of the cylinder is controlled by switches D and E which appear in FIG. 3, but the timing of the operation is controlled by other switches, which will be described in detail later in this description.

Pinned to one side of crosshead 96 is a link 102, and the upper end of the link 102 mounts a rack 104. Rack 104 can be engaged with a drive pinion 106 mounted on shaft 64, for indexing the case conveyor. In FIG. 3, rack 104 is meshed with the pinion ready for a lifting stroke of the drive cylinder piston 101. At the other side of the crosshead 96, is pinned a link 108, which mounts a rack 110 arranged for engaging the other side of the pinion 106 and turning it when the crosshead and rack are moved down by the drive cylinder 100. It will be noted that rack 110 is not in mesh with pinion 106 in the position of the apparatus illustrated in FIG. 3. Side guide plates 112 maintain alignment of the racks with the pinion 106. The upper ends of the racks are connected by a link 114 which spaces the racks so that one rack or the other will engage the pinion 106 and which permits the racks to be rocked back and forth for alternate engagement with the pinion.

In order to provide this rocking action, a plate 116 projects from rack 104, and a lock cylinder 120 is provided for shifting the racks back and forth. The free end of the lock cylinder 120 is pivotally mounted on the frame, and its piston rod 121 is pivotally connected to the plate 116 projecting from rack 114. The lock cylinder 120 is controlled by another four-way momentary solenoid control valve 120a, which appears in FIGS. 3 and 15. In order to control operation of the lock cylinder, a lug 122 projects from the crosshead 96, for alternate engagement with the arms of switches B and C, (FIGS. 3 and 15) at the lower and at the upper ends of the stroke of the drive cylinder 100. At the end of each drive stroke of cylinder 100, the lock cylinder is actuated to disengage the rack that has just completed its stroke from the pinion 106, and to mesh the opposite rack with the pinion. If any slight error in stroke length occurs, this final meshing action of a rack with the pinion, brings the teeth into perfect engagement. The nominal stroke of the racks is measured in multiples of half tooth pitches. So long as the error is less than that represented by about one third tooth of the pinion, the pinion will always be turned a predetermined number of teeth, and no cumulative errors in case position can occur. Also, since one rack begins to mesh with the pinion soon after the other begins to unmesh, the pinion cannot run free under the weight of cases on the conveyor during the transfer or shifting operation.

THE CARTON CONVEYOR

The carton conveyor 30 is illustrated in FIGS. 1, 3B, 4, 5, 7 and 8. As previously mentioned, the carton conveyor has a lead-in section to which the cartons are supplied at random spacing but are not brought together. The lead-in section includes the carton turning mechanism 32 for turning alternate cartons 90 degrees.

The carton conveyor also includes a transfer section, which gradually lays the cartons over for entry into the loading head, which is inclined at an angle of 45 degrees from the horizontal.

As best seen in FIGS. 1, 4, and 8, the lead-in section of the carton conveyor comprises frame elements 130, which mount a row of rollers 132. As seen in FIG. 8, a belt drive pulley 134 is mounted at the delivery end of the lead-in section of the carton conveyor, and the pulley is mounted on a drive shaft 136 rotatable in the frame. A carton supporting belt 138 is trained about the drive pulley 134 and the upper reach of the belt is supported by the rollers 132. An idler pulley (not shown) is provided for the belt at the delivery end of the carton conveyor. In order to drive the carton conveyor, and referring to FIG. 1, a drive sprocket 140 is mounted on shaft 136 which also mounts the drive pulley 134 for the belt. Sprocket 140 is driven by a chain 142, trained about the drive sprocket of a gear reduction drive motor 144 of conventional design. Guide rails 146, 146a are provided for supporting the carton in an upright position along the conveyor.

The transfer section of the carton conveyor 30 appears in FIGS. 1, 3B, 5 and 8. The transfer section has a frame 150 which is bolted to the main frame 54 of the apparatus. In the transfer section of the carton conveyor, the cartons are carried on spaced V-belts. A V-belt drive pulley 152 is mounted on a shaft 154 (FIG. 8), and a drive sprocket 156 is mounted on the same shaft. A drive sprocket 157 is mounted on a shaft 136 which also drives the lead-in section of the carton conveyor. The driving chain 158 is trained around sprockets 156 and 157 to drive the V-belt pulley 152. The V-belts are indicated at 160 and are trained around the drive pulley 152 and an idler pulley 162 seen at the right of FIG. 8. The idler pulley is mounted on a bracket 164, which is inclined at an angle of 45 degrees, to match the angle of inclination of the loading head 50, as seen in FIG. 1. The V-belts are tensioned by a roller 166, mounted in a bracket on frame 150.

In order to guide the cartons and lay them over as they enter the loading head, inside guide rail 168 and outside guide rail 168a are provided. These guide rails have horizontal lead in sections 170, 170a, respectively, and carton inclining sections 172, 172a, respectively. As the guide rails reach the loading head, they are bent back to a horizontal plane to form a transfer section 174, 174a. As seen in FIGS. 3B, 5 and 8, there is also a lower guide rail 178, which helps support the lower faces of the carton as they are inclined to enter the loading head. As seen in FIG. 7, the inner guide rails, namely the guide rails 168 and 178, are connected to a gate plate which moves up and down for interrupting the delivery of cartons to the loading head, as will be described in detail presently.

THE CARTON TURNING MECHANISM

In the embodiment of the invention being described, the cartons that are loaded into the cases are cardboard milk cartons having inclined top portions 186, which extend over indented portions 188, the latter portion serving as finger recesses for lifting the carton out of the case. The function of the carton turning mechanism is to turn alternate cartons 90 degrees, so that when the cartons are loaded in the case, the inclined top portions 186 provide access to the finger holes 188 of adjacent cartons. This can be clearly seen relative to the central carton in the case as illustrated in FIGURE 2.

Referring principally to FIGURE 4, the upper and inner guide rail 146a of the lead-in section of the carton conveyor has a bent portion 190, for accommodating turning of the cartons 35 at that region. The cartons 35 are fed through the input section of the carton conveyor at random spacing, but they are never brought into contact with each other before they reach the carton turner for reasons to be explained presently. Alternate cartons are turned by a carton turning lever 192, which in FIGURE 4 is shown in its advanced or projected position, and in the process of turning a carton. The carton turning lever is pivoted at 194 to a mounting plate 196, which is adjustably mounted on the frame 130 by the bolt and slot construction 198. The carton turning lever has an inwardly bent portion 200, and a carton engaging and turning finger or end portion 202.

The carton turning lever is operated by a solenoid 204 having an armature 206 terminating in a roller 208 that engages the carton turning lever. The solenoid is arranged so that when it is energized, the armature is projected outwardly and roller 208 engages the carton turning lever and brings the finger 202 into the path of the oncoming carton. The lever is returned by a spring 210. The solenoid 204 is mounted between a lower plate 212 and an upper plate 212a, the lower plate having an adjustable bolt and slot mounting 214 on the plate 196 previously described.

In order to keep track of the cartons that pass the turning mechanism, so as to sense the presence of every other carton, a carton sensing microswitch 220 and associated circuitry are provided. The microswitch is mounted on a plate 222 which, in turn, is mounted on the plate 212a previously described. The switch is operated by an arm 224 pivoted at 226 and integral with a carton finder arm 228 terminating in a carton sensing roller 230. A coil spring, not shown, urges the arms outwardly so that if no carton is at the switch, the roller 230 projects into the path of oncoming cartons. The switch is connected by a cable 302 to a box 304 containing the control elements for the carton turning arm 192.

Referring to FIGURE 4A, the heart of the counting mechanism is a stepping relay 236, having a ratchet wheel 238 and a ratchet arm 240 carrying a pawl 240a. The arm and pawl assembly are urged to the right (as viewed in FIGURE 4A) by a return spring 241. The arm and pawl assembly are shown in their advanced position in FIGURE 4A, their retracted position being shown in phantom, whereupon the arm is urged against a stop 241a. The arm and pawl assembly are actuated by a link 242 connected to the armature of a solenoid 244. When the solenoid 244 is energized, the arm and pawl assembly are brought to the position shown in full lines in FIGURE 4A, advancing the ratchet wheel ½ turn. On the shame shaft as that for the ratchet wheel 238, but shown separated for clarity, is a star wheel 246 having nodes or lobes 247, there being six nodes in the form illustrated. The nodes on the star wheel close a normally open switch 248, when they are under the switch. The star wheel permits the switch to open, when the star wheel is stopped with the switch disposed between adjacent nodes. The stroke of the ratchet arm is such as to alternately close and open the switch 248, as the solenoid 244 is energized and de-energized successively. The A.C. supply is connected in series with the ratchet solenoid 244 for the stepping switch, and with the microswitch 220, previously described as sensing cartons. The supply is also connected in series with the stepping switch 248 and the coil of solenoid 204 that actuates the turning arm 192.

In FIGURE 4A the microswitch 220 is closed, because a carton 35 is in engagement with the roller 230 of the switch operating arm. When switch 220 is closed, solenoid 244 is energized and the pawl and ratchet is moved to the left as viewed in FIGURE 4A, that is, in the solid line position. In this particular instance this motion has positioned the star wheel 246 so that the stepping switch 248 is between nodes and hence switch 248 is open. With switch 248 open, the solenoid 204 for the carton turning arm 192 is de-energized, the armature thereof is retracted, and the carton turning arm 192 is pulled back by spring 210 so that finger 202 is clear of the path of oncoming cartons.

Should the roller 230 next sense a gap between cartons, it will permit the spring operating the microswitch to open the switch. This de-energizes solenoid 244 of the stepping switch, and spring 241 pulls the arm to the right to the phantom line position in FIGURE 4A. Nothing happens to the circuit except that now the ratchet assembly is set. Upon the next closing of microswitch 220 by a carton, solenoid 244 is again energized pulling the ratchet arm to the left, as viewed in FIGURE 4A, and turning the star wheel 246 to bring the next node 247 under the stepping switch 248. This closes the stepping switch, energizes solenoid 204, projects the armature 206, and pivots the carton turning arm outwardly so that the finger 202 is in the path of the oncoming carton.

OPERATION OF THE CARTON TURNER

A cycle of operation of the carton turner will now be described briefly. Assume that the carton that has just passed the carton turner has been turned, and that the next carton (to be referred to as the "first" carton) is at the carton turner. This carton will have closed microswitch 220 and solenoid 244 will have been energized, so that the ratchet arm is in its advanced position. Assume also that the star wheel is adjusted so that switch 248 is between nodes, and hence is open so that the carton turning finger 202 is retracted and clear of the path of the oncoming first carton. The first carton thus passes the turning finger without being affected thereby. As the first carton clears the roller 230 on the microswitch, the switch senses the gap between the first and second cartons and is spring-urged outwardly into the gap. This opens microswitch 220 and de-energizes solenoid 244 of the stepping switch. Spring 241 now retracts the ratchet arm to the cocked position shown in phantom lines in FIGURE 4A, but this has no effect on the star wheel so that the carton turning finger 202 remains in its retracted position and permits the first carton to continue past the finger 202 without obstruction.

However, as soon as the second carton is brought against the roller 230, it re-closes the microswitch and re-energizes the solenoid 244 of the stepping switch. This advances the ratchet arm and turns the star wheel to bring a node under stepping switch 248. This energizes solenoid 204 that operates the carton turning arm and projects finger 202 into the path of the second carton. As the second carton is advanced by the conveyor, the finger 202 initiates and concludes the turning action thereof. This is the action illustrated in FIGURE 4 of the drawings. The microswitch remains open during the turning action, and the turning arm finger remains projected.

However, when the third carton reaches the roller 230 it engages the roller and again closes microswitch 220. This energizes the stepping switch solenoid 244, which solenoid again advances the ratchet and star wheels and brings the zone between nodes beneath the stepping switch 248. This opens the stepping switch 248, de-energizes solenoid 204 that operates the carton turning lever, and permits spring 210 to retract the lever so that finger 202 will clear the third carton, which carton is not to be turned.

THE GATE MECHANISM

The gate mechanism 40 is best seen in FIGURES 3, 3B, 6, 7 and 9. The function of the gate mechanism is to interrupt entry of cartons to the loading head after three cartons have been advanced onto the head, and to accomplish this without interfering with the action of the trailing cartons in pushing a row of three cartons onto the loading head. The cartons are carried to the gate mechanism by V-belts 160, and are guided by rods 168 and 178 which are mounted on a plate forming part of the gate mechanism, as seen in FIGURES 3B and 7.

An important element of the gate mechanism is a swinging gate plate 250 which is movable in a vertical plane and pulls the guide rods 168, 178 below the plane of a way 252, mounted on the frame of the apparatus. The gate is shown in its lowered position in FIGURE 7 and it can be seen that once so lowered, the gate prevents a fourth carton from entering the loading head. In order to reciprocate the gate, a flange 254 is mounted on gate plate 250, which flange serves the dual purpose of pivotally mounting the gate on the frame and providing a connection of its operating cylinder. The gate is pivotally mounted by means of a rod 256, welded to plate 250, which rod is pivoted to the frame of the apparatus by a combined clamp and pivot mounting 258, best seen in FIGURES 3 and 9.

In order to insure that the cartons follow the motion of the gate, a hold-down rod 260 is mounted for motion with the gate. As best seen in FIGURE 3 this rod is an L-shaped member clamped in a flange 262 (which also appears in FIGURE 7) that is welded to the swinging gate plate 250. A carton hold-down roller 264 is mounted on the end of the rod, and insures that the carton moves with the guide rods 168, 178 as best seen in FIGURE 7. In addition to rods 168, 178 a carton lead in shoe 266 is mounted on the upper side of the gate plate. The shoe is best seen in FIGURES 3B and 7.

The gate is raised and lowered by its operating cylinder 270, having a piston rod 271 pivoted to the flange 254, as best seen in FIGURE 7. The free end of the cylinder is pivotally mounted on the frame at 272, as best seen in FIGURES 3 and 7. Referring to FIGURE 7, it can be seen that when the gate is lowered, a carton restraining shoulder 276 is presented to the oncoming cartons, that is, those that are not on the loading head when the gate is lowered. However, when the gate is raised, these parts are flush, and cartons pass freely over the gate to the loading head. FIGURE 7 shows the gate in its lowered position with a row of three cartons on the loading head. Actually, the gate is lowered before all three cartons are finally positioned in the loading head, in order that the fourth carton and any behind it can serve to push the row of three cartons onto the loading head. As long as the third carton is adequately supported by the loading head and associated frame structure when the gate is lowered, the lowering of the gate will not interfere with the operation of the device but will insure that the fourth carton, when it reaches the shoulder 276, cannot advance onto the loading head, but is restrained as illustrated in FIGURE 7.

The gate is timed by a switch H mounted behind a stop plate 306 having a projecting arm 278 (FIGS. 3, 4B and 4C).

THE LOADING HEAD

The loading head is best seen in FIGURES 3, 7, 9 and 10. As mentioned, it is inclined at an angle of 45 degrees to the horizontal, and is perpendicular to the case conveyor. In the embodiment of the machine illustrated, the loading head lowers a row of three cartons at a time into the case beneath it, and is then raised or retracted to its loading position. As will be explained presently, interlock controls are provided so that the loading head will not descend unless it has received a full row of three cartons, and unless a case is properly positioned beneath it.

During the loading operation, the cartons have their lower faces supported on a reciprocating loading plate 280, which is guided in ways 252 and 252a, the way 252 having previously been described in connection with the operation of the gate mechanism. The cartons are guided onto the loading plate 280 by the terminal portion 174a of guide rail 168a, which is mounted in a bracket 281 that is fixed to the frame of the apparatus, this mounting appearing in FIGURES 7, 9, and 10. Below the terminal portion of rail 168a is a short guide rail 282 to which a guide plate 284 is welded. Guide rail 282 is mounted on and projects from a bracket 286, as seen in FIGURE 10. The relation of the guide plate 284 to the lower guide rail 282 is best seen in FIGURE 9.

The loading plate 280 is reciprocated by a pair of endless chains 290, each chain being connected to the loading plate by a lug 292, one of which appears in FIGURE 9 where the loading plate has been broken away. The chains are driven by a drive shaft 295, drive sprockets 296, and are trained around a pair of idler sprockets 297 shown in FIGURES 3 and 9. In order to insure that the cartons do not hang back as the mounting plate 280 lowers, a pusher plate 298, best seen in FIGURE 9, is mounted on the loading plate above the tops of the cartons.

The loading plate is reciprocated by a loader cylinder 300, controlled by a spring loaded four-way valve 300a, shown only in the diagram of FIGURE 15. Reciprocation of the loading cylinder is converted into rotation of the drive shaft 295 by means of a rack 302 mounted on the piston rod of the loader cylinder that meshes with a pinion 304 on the drive shaft 295. This arrangement of parts is best seen in FIGURES 7, 9 and 10.

The operation of the loader cylinder is controlled in part by a switch I mounted behind the stop plate 306. The arm 308 of switch I is engaged by the row of cartons after they are almost completely loaded onto the loading head. As mentioned, the cartons also engage the arm 278 of gate timer switch H mounted behind stop plate 306, which serves to partially control operation of the gate mechanism. Stop plate 306 and switches H and I are best seen in FIGURES 3, 4B, 4C, and 9. As seen in FIGURE 4C, the loader cylinder switch I is mounted behind plate 306, and the arm 308 projects outwardly from but lies relatively close to the plate. The gate switch H is similarly mounted, but its arm 278 projects farther out from the plate, in fact it may project as far as half a carton width from the plate. With this construction the gate switch H is closed first, so that the gate is lowered before the loading head is fully loaded, but as previously described, this does not interfere with the loading operation. On the other hand, since arm 308 of the loader switch I is close to plate 306, loader operation will not be initiated until the cartons are suitably positioned on the loading head. As seen in FIGURE 15, the loader cylinder 300 is controlled by the spring loaded four-way loader valve 300a which is operated by a solenoid S–I controlled in part by the loading switch I.

In order to support the cartons on the loader plate during the loading operation and during an initial portion of the descent of the loading plate in a loading cycle, a retractable shelf 312 is pivotally mounted on the frame of the apparatus by means of a shaft 314. The relation of the plate 312 and the shaft are best seen in FIGURE 7 of the drawings. The shelf 312 is moved to its raised position by an arm 316 projecting from shaft 314 and carrying a roller 317. The arm 316 is best seen in FIGURE 7. The shelf lifting arm 316 is actuated by a combined brake cam and shelf operating plate 318 which, as best seen in FIGURE 10, is mounted on loader rack 302. Plate 318 has a surface 320 projecting upwardly from and perpendicular to the rack, which surface engages the roller 317 of the shelf lifting arm 316. Flush with surface 320 and projecting outwardly from plate 318 is a plate 321, for operating a conveyor drive impulse switch F. This plate is best seen in FIGURES 7 and 10. In order to retract or lower the carton supporting shelf 312, a shelf retracting arm 322 is mounted on the end of shaft 314 opposite the end on which the arm 316 is mounted. As seen in FIGURE 3, a shelf lowering spring 324 connects between the retracting arm 322 and a fixed portion of the apparatus, in order to lower the carton supporting shelf 312 if the arm 316 will so permit. The operation of the carton supporting shelf will be explained in conjunction with the operation of the brake mechanism after the latter has been described in detail.

THE BRAKE MECHANISM

The brake mechanism functions to facilitate early acceleration of the cartons during the initial portion of the loading cycle and to control the cartons so that they do not slam against the bottom of the case, and yet permit them to completely enter the case and bottom therein, without need for positive carton abutment means. Control of the cartons is provided solely on frictional engagement during the latter part of the loading cycle. The brake mechanism is best seen in FIGURES 3, 7, 9 and 10. The mechanism is mounted on spaced mounting brackets 330, 330a projecting upwardly from the frame 54. Mounting bracket 330 is clearly seen in FIGURE 10, and both brackets appear in FIGURE 9. The brackets support a brake operating shaft 332 which, as best seen in FIGURE 9, mounts three arms 334. These arms are welded to a brake shoe mounting plate 336.

The brake shoes are formed of two thin steel spring plate members 338, 339 which are welded to plate 336 and which are notched to accommodate arms 334. These plate members are slotted to provide spring fingers 340, the slots being about ⅛ inch wide and the fingers being about 1 inch wide. Rubber friction shoes 341 are bonded to fingers 340, as seen in FIGURE 10A, and serve to provide the carton engaging friction surfaces. Application of the brake to the descending cartons is first increased, and then decreased by a cam and arm assembly. As best seen in FIGURES 7 and 10, a brake operating arm 342 projects substantially horizontally from the brake operating shaft 332, and carries a roller 344. Plate 318, previously described, is as best seen in FIGURE 10, formed with two arm controlling surfaces or cam portions. The plate is formed to provide a brake applying cam portion 348 and a brake releasing cam portion 350, these cam portions providing a cusp-like configuration, as seen in the figure. As is also seen in FIGURE 10, an auxiliary stop arm 352 and a stop pin 354 may be provided to prevent the brake from falling down under its own weight, in case the cam plate is not installed.

CASE HOLD-DOWN DEVICE

As seen in FIGURES 7, 9, and 10, a hold-down device is provided to insure that the case will remain in place during the descent and retraction of the loading head.

This device is in the form of an arm 360 that is pivotally mounted on the frame, and carries a case engaging roller 362. The roller 362 is pressed against the case by a spring 364, but a stop 366 (FIG. 10) prevents the spring from lowering the roller 362 far enough to interfere with entry of a case under the roller.

OPERATION OF THE SHELF AND BRAKE MECHANISM

The operation of the loading head carton supporting shelf and brake mechanism is indicated diagrammatically in four steps in FIGURES 11, 12, 13 and 14.

In FIGURE 11 the loading head is in its raised position and has received a row of three cartons. The rack 302 is in its lowered or retracted position so that the cam plate 318, which is connected to the rack, is also in its lowermost position. In this position the cam surface 320 on plate 318 is in full engagement with the roller 317 on the end of the shelf lifting lever 316, and the shelf 312 is in its upper or raised position supporting the bottom of the cartons 35 on the loading head. When the loader cylinder 300 is actuated, the rack moves upwardly and the carton loading plate 280 moves downwardly at twice the speed of rack motion. Since the carton lifting shelf arm 316 is pivotally mounted on the frame by shaft 314, upward motion of the rack and the attached plate 318 withdraws the surface 320 from the roller on the shelf lifting arm, and permits spring 324 to lower the shelf. Simultaneously, the roller 344 on brake operating arm 342 rides along the brake applying cam surface 348 on plate 318.

Referring to FIGURE 12, the parts are shown in position wherein the shelf 312 has been retracted enough so that it is about to completely clear the descending loading plate 280. Also, the brake shoes 340 are beginning to frictionally engage the corner of the cartons.

In FIGURE 13 the cartons are approximately half way down into the case. Brake application pressure is now at a maximum because the roller on the end of the operating arm for the brake is at the cusp formed by the two cam surfaces. The shelf 312 is fully retracted, but control of the cartons is maintained by application of the brake thereto. Further descent of the loading head from the position of 312 will soon begin release of the brake and eventually the cartons will slide toward their final positions in the case even though a slight braking pressure may be exerted on the cartons.

FIGURE 14 shows the loading head in its lowermost position. The cartons have fallen clear of the brake and are bottomed in the case. It can be seen that the carton loading plate 280 does not descend the full depth of the case and, in fact, may even begin to return to its upper position before the cartons are fully bottomed in the case. In any event, the combined action of the shelf and the carton restraining brake assures reliable loading of a row of cartons into the case without slamming the cartons against the bottom of the case. Despite the relatively gentle handling provided by the apparatus, it can be operated at high speed without damage to the cartons. The apparatus illustrated and described operates to load approximately 81 cartons per minute, which means that a complete loading cycle, that is, the descent and return of the loading head and reloading of the loading head takes place in something over two seconds. Since this includes the time required to reload the loading head with three cartons, the actual cycle of the loading head itself occurs over a shorter period of time.

THE CONTROL CIRCUIT AND RESUME OF OPERATION

In this portion of the specification, the complete control circuit will be described, including certain elements thereof which have not heretofore been mentioned. The circuit will be described in terms of an operating cycle, introducing the various circuit elements as required for understanding of such operation. This operation will be described primarily in connection with the schematic diagram of FIGURE 15.

EMPTY CASE POSITIONING

Assume that an empty case 25 has been positioned under the loading head as indicated in FIGURES 3 and 11 to receive a first row of cartons. As mentioned, the case shown in the drawings is a three row case and since there are three cartons in a row, it holds nine cartons. The case is about three-quarters of an inch longer and three-quarters of an inch wider than the width of three cartons or about twelve inches square. The mechanism is timed so that the case is stopped when its leading edge is about one-half of an inch past the projection of the lower faces of the first row of cartons to be loaded into the case, so that there will be no interference as the carton loading plate descends. With the case in this position, case drive stop switch A will have been engaged by the case to open a normally closed contact 376 and close a normally open contact 378. This stops the drive to the case conveyor, and performs other functions as will be explained as the description of operation proceeds.

As to the case lifter, which operates at this time, carton support lug 84 will have momentarily closed the switch O, which energizes a line 380 and solenoid S–O of the case lifter control valve 70a. At this point it will be noticed that in FIGURE 15, in order to avoid confusion the A.C. supply lines are drawn as heavy lines and are not connected together. Similarly, in order to avoid introducing unnecessary ground leads, the ground portions of the power supply are indicated as grounds.

When solenoid S–O of valve 70a is energized as just described, the case lifter cylinder 70 lowers the case lifter 60 to the position shown in FIGS. 1 and 15. An empty case is then fed to the case lifter, and as it is pushed along the lifter the case closes switch N, which energizes solenoid S–N of the case lifter valve 70a through a line 381. Valve 70a is now shifted, causing the case lifter cylinder 70 to raise the case lifter 60. The empty case just loaded on the case lifter now slides down against the uppermost lug 84 on the case conveyor chains 80.

As to the case conveyor drive mechanism, it will be assumed that the case conveyor drive racks 104, 110 have been lowered by the drive cylinder 100. In this condition, normally open switch B will be closed, and a time delay relay TD–B will be energized through a line 382. This, in turn, energizes solenoid S–B of the lock cylinder valve 120a through line 384, and hence lock cylinder 120 has moved racks 104, 110 to the left (as viewed in FIGURE 15) so that rack 104 meshes with and locks the pinion 106 that drives the case conveyor chains.

With the racks to the left as viewed in FIGURE 15, they are in position to raise the drive cylinder 100 for the next indexing of the case conveyor. It can be seen in FIGURE 15 that the closing of normally open switch D by the racks sets up a line 386 leading from switch D to solenoid S–D on valve 100a for the drive cylinder 100. However, closing the switch D at this time does not cause operation of the drive cylinder, because lines 388 and 388a which bring the A.C. supply to switch D during automatic indexing is opened at normally closed contact 376 of switch A, by the presence of a case in loading position, as previously described. For loading head control, a line 388b connects to the line 388 leading to the drive cylinder control switch D (as well as to switch E) which line connects to the contact of impulse switch F. The impulse switch F is of the type which closes when it is first engaged by lowering of the loading rack, and then re-opens automatically. Thus, switch F is also open, it having only been momentarily closed when the loader rack 302 was last brought to its lower position in order to bring the loading head to its upper position after completion of the loading operation for the previous case. The operation of the impulse switch F when it is next closed, will be described presently. As mentioned, at this time switch F is open, and therefore cannot energize the drive cylinder valve 100a.

PRE-LOADED CONDITION OF THE LOADING HEAD

Assume, as seen at the left of FIGURE 15, that the first row of cartons is just about loaded onto the loading head. The normally closed gate control switch H has not been opened by the leading carton at this time, and hence switch H is closed. Solenoid S–H of the gate cylinder control valve 270a is now energized through a line 390, and a normally closed gate timer switch J, which connects switch H to the A.C. supply when the loading cylinder rack 302 is in its lower position, and hence when the loading head is in its upper position. With the solenoid S–H of the gate cylinder valve 270a thus energized through the line 390, the valve 270a has been shifted to cause the gate cylinder to raise the gate to its upper position and keep it there until the solenoid S–H is de-energized.

Referring again to the cartons being loaded and as shown at the left of FIGURE 15, it will be seen that the normally open loader cylinder switch I has not been engaged by the cartons, and hence the switch is open. The contact of switch I connects by a line 392 to solenoid S–I of the loader valve 300a. The pole of this switch connects by a line 394 through the contact of a timing interlock switch G. Switch G is now closed by one lobe of a four-lobe cam 396, mounted on the drive shaft 64 for the case conveyor chains. The four-lobe cam 396 is so timed and is so positioned relative to the other parts of the apparatus, that switch G will only be closed at intervals corresponding to motion of the case conveyor by one carton width, and when such intervals coincide with a case position that is in alignment with the loading head for receiving cartons.

The pole of interlock switch G is connected to two lines. At this point, only a line 398 will be discussed. This line leads to the normally open contact 378 of the case drive stop switch A, which contact is now closed by the case under the loader head. This sets up the loader cylinder control circuit for initiating a loading cycle as soon as the normally open loader cylinder control switch I is closed by a row of cartons.

LOADING INITIATION

When the leading carton of the row of three cartons entering the loading head approaches the plate 306 (FIG. 4C), as can be seen at the left of FIGURE 15 the leading carton will first open the normally closed gate control switch H, thereby disconnecting solenoid S–H from the A.C. supply. The spring of the solenoid valve 270a now shifts the valve, causing the gate cylinder 270 to lower the gate, thereby preventing entrance of the fourth carton to the loading head, as previously described. However, since the third carton projects over the shoulder 276 formed by lowering of the gate, this shoulder does not interfere with the action of the fourth carton in continuing to push the first three cartons onto the loading head.

The final motion of the leading carton of the first row of cartons closes the normally open loader cylinder control switch I. As previously mentioned, the circuit for actuating the loader cylinder valve solenoid S–I had previously been set up by switches G and A, so that as soon as switch I is closed by the cartons, the loading cycle starts, and rack 302 is raised by the loader cylinder. This lowers the carton loading plate 280 as previously described, and initiates the loading cycle.

Early in the loading cycle, the descending cartons clear the normally closed gate control switch H, thereby setting up the gate lifting circuit. However, the gate circuit remains interrupted at switch J which is opened when the rack 302 is raised to initiate loading, and switch J is held open until the rack has both fully advanced and fully retracted to bring the loading head back to the carton receiving position.

RAISING THE LOADING HEAD

Late in the loading cycle, that is, when the cartons are approximately two inches from the bottom of the case, the descending cartons clear the arm of the loading cylinder switch I. Since this is a normally open switch, this opens the circuit to the solenoid S–I of loader valve 300a, and the valve spring shifts the valve to cause the loader cylinder 300 to retract and lower the rack 302, thereby raising the loader head.

When the loader rack 302 has been fully retracted and the loader head is in its fully raised position, the normally closed gate timer switch J is permitted to close, and since there are no cartons on the loader head, the normally closed gate timer switch H has also been permitted to close. Thus, the solenoid S–H of the gate cylinder valve 270a is connected to the A.C. supply through the line 390, and the gate is raised. As soon as the gate is raised, the leading carton is released and a new loading cycle at the loading head begins. The second row of cartons is now loaded on the loading head ready for being lowered into the case, provided that the case has been advanced by one carton width.

CASE CONVEYOR ADVANCE

When the loading head reaches its uppermost position, the cam plate 318 connected to the rack 302 will have been retracted to its lowest position (FIG. 10) and plate 321 on the cam plate closes the impulse switch F momentarily. This connects lines 388b and 388 from the drive cylinder switches D and E to a line 400 connected to the pole of the impulse switch F. Line 400 connects to the line 398 at the pole of switch G. Line 398 had been previously connected to the A.C. supply through contact 378 of switch A, that is closed whenever a case is under the loading head, and in engagement with the arm switch A. The circuit for operating the case drive is now energized.

As to the case drive mechanism, it will be recalled that the lock cylinder has moved the racks to the left and that normally open switch D is closed. This has set up the circuit to the solenoid S–D of drive cylinder valve 100a, and now that line 388 is energized through switches A and F, solenoid S–D shifts the valve 100a and causes the drive cylinder 100 to lift the racks. This advances the case under the loading head as rack 104 turns the pinion 106 and shaft 64. The four-lobe cam 396 is also turned. In the apparatus as described, a stroke of the drive cylinder represents one-quarter turn of shaft 64 and of the four-lobe cam 396, so that another lobe of cam 396 is brought under the arm of switch G after one-quarter turn of shaft 64. The upward motion of the racks is limited to produce one-quarter turn of shaft 64 when, as previously described, the jam nut 101a (FIG. 3) strikes the lower end of the cylinder 100. This terminates the case conveyor drive stroke. The case will now be positioned to receive the second row of cartons, because the quarter rotation of shaft 64 represents a case conveyor motion of one carton width, which is 3¾ inches in the example being described.

Near the end of the lifting stroke of the rack, lug 122 on the crosshead 96 closes the normally open lock control switch C, which energizes the solenoid of a time delay relay TD–C. After approximately one tenth second, the contacts of relay TD–C close, to energize the solenoid S–C of four-way valve 120a through a line 402. Valve 120a now shifts, and the lock cylinder 120 moves the racks to the right (as viewed in FIG. 15), causing rack 110 to mesh with the gear 106 and lock the case conveyor. The elimination of cumulative errors provided by this action has been previously described. The loading cycle for the second row of cartons is next completed, and duplicates the cycle for loading the first row of cartons, which has been described in detail.

When the lock cylinder shifts the racks to the right, normally open switch D is permitted to open and normally open switch E is closed. The contact of switch E connects to solenoid S–E of drive cylinder valve 100a by a line 404. Since contact 376 of switch A has been opened by a case, the automatic index line 388a is open, and lines 388b, 388 and 404 remain under control of the impulse switch F, operated by the loader head. Thus, when the loading of the second row of cartons in the case has been completed, and the loader head reaches its uppermost position, the rack 302 of the loader head will be in its lowermost position and will momentarily close impulse switch F again. Since the case drive cylinder switch E is now closed, solenoid S–E shifts valve 100a and rack 110 is lowered by the case drive cylinder. This indexes the case conveyor to bring the case under the loading head in position for receiving the third row of cartons. At the end of the index stroke, switch B is again closed to cause the lock cylinder to shift racks 104, 110 to the left, to re-mesh rack 104 with the pinion. A loading cycle for the third row of cartons is then completed through switches I, G and A as previously described.

After the third row of cartons has been loaded, switch A is still engaged by the case, and hence is in the position shown in FIGURE 15, wherein contact 376 is open so that control of the case drive mechanism remains under the impulse switch F. Thus, when the loading head returns to its uppermost position after loading the third row of cartons into the case, and when the loading head rack 302 returns to its lowermost position, the impulse switch F is again momentarily closed. This initiates the third advance of the case conveyor by one carton width, followed by shifting of racks 104, 110 to the right as switch C is closed and the end of the lifting stroke of the racks. However, the case just loaded now clears switch A, so that the arm of the switch closes contact 376 and connects lines 388a, 388 directly to the A.C. supply. The case conveyor is now on automatic control, i.e., it is controlled through switches B and C, which actuate the lock cylinder automatically. The latter action in turn operates the switches D and E, which actuate the drive cylinder for reciprocation of the racks. In the setting of the apparatus being described, after clearing switch A, the case conveyor advances a fourth time and a fifth time, switch A remaining in the position wherein contact 376 is connected to the A.C. supply as just described.

The case conveyor next automatically advances a sixth time, but this advance brings a new case into loading position for receiving the first row of cartons, and the new case engages switch A, opening contact 376, thereby de-energizing the automatic case conveyor circuit 388a, 388 and returning control of the case conveyor to the impulse switch F that is operated by the loading head. Contact 378 is closed at this time by the engagement of the arm of switch A by the case, which sets up the loader cylinder control circuit for demand controlled loading operation, as previously described. During the final indexing motion of the case conveyor, a lug 84 on the case conveyor chain engages and momentarily closes switch O, which lowers the case lifter to receive a new case, as previously described. As soon as a new case closes switch N at the case lifter, the case lifter is raised to feed the new case to and against the uppermost lugs 84 on the upper reach of the case conveyor chains.

It can be seen in reviewing operation of the control circuit that a number of precautions have been taken to insure jamb free operation and complete filling of cases. Four-lobe cam 396 and switch G insure that the loading operation cannot occur unless the case conveyor chains have been indexed a full carton width. The apparatus is demand operated, and responds to the presence of three, and no less than three, cartons on the loading head, due to the action of the loader cylinder switch I that is engaged by the cartons when a row of three cartons is fully loaded on the head. Impulse switch F insures that the case conveyor cannot be advanced until a loading cycle has been completed, with the loading head at its uppermost position. The case conveyor is shifted from a demand control under control of the loader switch I and the impulse switch F, to an automatic index control for presenting a new case beneath the loader head by the operation of switch A. All of these interlocks and safety precautions insure reliable, high production loading operation.

While one embodiment of the present invention is described herein, various changes may be made therein without departing from the spirit of the invention as defined in the appended claims.

Having thus described our invention, what we claim and desire to secure by Letters Patent is:

1. Casing apparatus for cartons comprising an inclined carton supporting and loading head, an inclined case conveyor for delivering cases in single file beneath said loading head, said loading head including a carton bottom supporting shelf and carton side guiding plate means, a carton conveyor comprising belt means for frictionally supporting and bringing a selected number of cartons onto said shelf and against the plate means of said loading head, carton guide rail means disposed along one side of said carton conveyor, said guide rail means and said carton conveyor belt means causing the cartons to gradually incline from a vertical position to the angle of inclination of said loading head, and means for interrupting forward motion of a corner of the carton that trails said selected number of cartons, after said selected number of cartons has been pushed onto said shelf by said trailing carton on the carton conveyor, said carton motion interrupting means comprising a carton guiding gate member movable from a position wherein it is aligned with said carton guiding plate means of said loading member to a position wherein it is offset outwardly from said wall to provide a carton abutment shoulder.

2. Casing apparatus for articles comprising an article lowering head including an article supporting shelf, an article conveyor for bringing a selected number of articles to the shelf of said article lowering head, a case conveyor for bringing cases beneath said article lowering head, and drive means for precisely indexing said case conveyor by one article width, said drive means comprising a pinion for driving the case conveyor, parallel racks straddling said pinion, means connecting said racks in spaced relation, said racks being spaced so that when one rack is meshed with the pinion the other is clear of the pinion, means for reciprocating said racks over a fixed stroke, and means for shifting said racks back and forth to alternately mesh the racks with said pinion, means for operating said rack shifting means only after a stroke of said rack shifting means has been completed, said racks being co-planar so that the pinion is temporarily freed for limited rotation early in the shifting operation for causing the rack being meshed with the pinion during shifting to cam the pinion into final mesh wth such rack.

3. Casing apparatus for articles comprising an article lowering head including an article supporting shelf, an article conveyor for bringing a selected number of articles to the shelf of said article lowering head, a case conveyor for bringing cases beneath said article lowering head, and drive means for precisely indexing said case conveyor by one article width, said drive means comprising a pinion for driving the case conveyor, parallel racks straddling said pinion, means connecting said racks in spaced relation, said racks being spaced so that when one rack is meshed with the pinion the other is clear of the pinion, means for reciprocating said racks over a fixed stroke, means for shifting said racks back and forth to alternately mesh the racks with said pinion, means for operating said rack shifting means only after a stroke of said rack shifting means has been completed, said racks being co-planar so that the pinion is temporarily freed for limited rotation early in the shifting operation for causing the rack being meshed with the pinion during shifting to cam the pinion into final mesh with such rack, a control circuit for said case conveyor drive means including switch means alternately operated upon shifting of said racks, and a control circuit for said rack shifting means including switch means alternately operated upon reciprocation of said racks.

4. Casing apparatus for articles such as cartons comprising an article lowering head inclined from the horizontal, a case conveyor for bringing cases beneath said article lowering head, means for lowering and raising said head relative to said case conveyor, an article supporting shelf pivotally mounted adjacent the bottom of said head, shelf operating means synchronized with said head for raising said shelf to a position wherein it extends perpendicularly to said head adjacent the bottom thereof when the head is in its upper position, and for retracting said shelf to release the articles for sliding relative to said head when the head has been lowered, and conveyor means for bringing a selected number of articles in single file to said shelf.

5. The casing apparatus of claim 4, wherein said shelf operating means comprises an abutment on said head lowering means for raising the shelf, and spring means for retracting the shelf.

6. Casing apparatus for cartons comprising carton lowering means, a case conveyor for delivering cases in single file beneath said carton lowering means, a carton conveyor for frictionally supporting and bringing a selected number of cartons to said carton lowering means, said carton lowering means including first cartons guiding means for guiding one lateral side of the cartons after the cartons have left said carton conveyor, and means for interrupting forward motion of a side corner of the carton that trails said selected number of cartons after said selected number of cartons has been pushed onto said carton lowering means by said trailing carton on the carton conveyor, said carton motion interrupting means comprising a second carton guiding means mounted at the delivery end of said carton conveyor and ahead of said carton lowering means, and means for shifting said second carton guiding means from a position wherein it is aligned with said first carton guiding means to a position wherein it is offset outwardly from said first guiding means for causing the edge of said first guiding means adjacent said carton conveyor to provide a carton abutment shoulder.

7. The apparatus of claim 6, wherein said carton lowering means is inclined from both the horizontal and the vertical, and has a retractable shelf for supporting the bottoms of cartons, and wherein said first carton guiding means comprises a plate that supports the sides of the cartons.

8. The casing apparatus of claim 6, wherein a carton hold down arm is mounted for movement with said second carton guiding means.

9. Casing apparatus for cartons comprising a frame, a carton lowering head inclined from the horizontal, said apparatus including a retractably mounted carton supporting shelf for supporting the bottoms of cartons, a case conveyor for bringing cases beneath said head, means for reciprocating said carton lowering head in said frame into and out of cases on said case conveyor, carton conveyor means for bringing a selected number of cartons to the shelf of said carton lowering head, a friction brake adjustably mounted on said frame for engaging cartons as they are being lowered into a case by said head, means synchronized with the lowering motion of said head for first applying and then releasing said brake as the cartons are being lowered by said head, and means for retracting said carton supporting shelf from beneath the bottoms of the cartons before the carton lowering operation has been completed, to place control of the cartons under said brake.

10. Casing apparatus for cartons comprising a frame, a carton lowering head inclined from the horizontal a case conveyor for delivering cases in single file to said head, means for reciprocating said head in said frame into and out of a case, said head including a shelf for supporting the bottoms of cartons when said head is in its upper position and plate means for guiding the sidewalls of cartons, a carton conveyor for frictionally supporting and bringing a selected number of cartons to the shelf and plate means of said head, means for interrupting forward motion of a corner of the carton that trails said selected number of cartons, after said selected number of cartons has been pushed onto said shelf and plate means by said trailing carton on the carton conveyor, said carton motion interrupting means comprising a shiftable gate member mounted at the delivery end of said carton conveyor and ahead of said carton lowering head, and means for shifting said gate member from a position wherein it is aligned with said plate means to a position wherein it is offset outwardly from said plate means for causing the edge of said plate means adjacent said carton conveyor to provide a carton abutment shoulder, a friction brake adjustably mounted on said frame for engaging cartons as they are being lowered into a case on said case conveyor by said head, means synchronized with said head for first applying and then releasing said brake as the cartons are being lowered, and means for retracting said shelf before completion of the carton lowering operation.

11. Apparatus for loading cases with a plurality of individual rows of a fixed number of square cartons of the type that have a convex top with finger lifting recesses on opposite sides of the top, said apparatus comprising a case conveyor, a case loading head, a horizontally located carton conveyor for conveying single file a stream of cartons to said loading head, means on said carton conveyor upstream of said loading head for turning through an angle of 90° about a vertical axis alternate cartons in the stream of cartons that will make up one of the individual rows of cartons, in order to render said finger lifting recesses accessible after the cartons have been loaded in a case, and means for causing said case loading head to deposit the individual rows of oriented cartons in cases on said case conveyor.

12. Case loading apparatus comprising a case conveyor, means for driving said case conveyor intermittently and in discrete steps substantially equalling the width of an article, means for loading articles into cases on said case conveyor, an article conveyor for delivering articles to said case loading means, means for driving said article conveyor, means for operating said case loading means, control means for said case loading operating means including a loading circuit and demand switch means for setting up said circuit for initiating a loading cycle after the successive loading of a predetermined number of articles onto said case loading means, and interlock incremental switch means synchronized with said case conveyor and connected to said circuit for locking out the operating means for said case loading means except when a case has been advanced by one full step by said case conveyor.

13. Case loading apparatus comprising a case conveyor, an article loading head, means for driving said case conveyor intermittently and in discrete steps substantially equalling the width of an article, an article conveyor for delivering articles to said loading head, gate means for intercepting the entrance of articles to said loading head after the required number of articles has been fed to the head, means for driving said article conveyor, means for operating said loading head, control means for said article loading head including a loading circuit and demand switch means responsive to set up the loading circuit for initiating a loading cycle after said case conveyor has loaded a predetermined number of articles onto said loading head, and a gate means timer switch at said loading head, said timer switch being actuated by the articles being fed to the loading head for operating said gate means before the required number of articles have been fully loaded on the head.

14. The apparatus of claim 13, wherein said loading circuit includes an incremental interlock switch synchronized with said case conveyor driving means.

References Cited by the Examiner

UNITED STATES PATENTS

| | | | |
|---|---|---|---|
| 2,236,945 | 4/1941 | Gibbs | 53—160 |
| 2,584,925 | 2/1952 | Rideout | 53—374 XR |
| 2,819,576 | 1/1958 | Hendericks et al. | 53—166 |
| 2,900,775 | 8/1959 | Carlson et al. | 53—160 |
| 3,142,948 | 8/1964 | Arnett | 53—166 XR |
| 3,143,223 | 8/1964 | McIntyre et al. | 53—143 XR |

FOREIGN PATENTS 801,514 9/1958 Great Britain.

TRAVIS S. McGEHEE, *Primary Examiner.*

FRANK E. BAILEY, R. A. LEYHEY, *Examiners.*

A. E. FOURNIER, *Assistant Examiner.*